Nov. 16, 1948.   J. M. BESORE   2,454,030
FILTER
Filed Sept. 27, 1944   2 Sheets-Sheet 1

Inventor
JAY M. BESORE
By Semmes Keegin Beale & Semmes
Attorneys

Nov. 16, 1948.  J. M. BESORE  2,454,030
FILTER
Filed Sept. 27, 1944  2 Sheets-Sheet 2

Inventor
JAY M. BESORE
By Semmes Keegin Beale & Semmes
attorneys

Patented Nov. 16, 1948

2,454,030

UNITED STATES PATENT OFFICE 2,454,030

FILTER

Jay M. Besore, Chevy Chase, Md., assignor, by mesne assignments, to The Briggs Filtration Company, Bethesda, Md., a corporation of Maryland Application September 27, 1944, Serial No. 556,009

7 Claims. (Cl. 285—1)

This invention relates to the art of filtration, and more particularly has reference to a cartridge or refill for a filter, especially a filter for the oil of the lubrication system of an internal combustion engine.

The present invention finds particular application in connection with a cylindrical filter cartridge, and certain aspects of it are directed specifically to such a cartridge as is composed of a filtering material that is adapted to shrink over a period of operation. A cylindrical cartridge is usually arranged within the filter casing in such a way that all or certain controlled amounts of the oil introduced to the casing are directed through the walls of the cartridge, either from the outside to the inside, or vice versa. To insure this flow of the oil, it is usually necessary to employ gaskets to prevent leakage between the cartridge and the means which secure it in position, and some difficulty has been experienced in devising an efficient type of gasket. It is one of the primary objects of this invention to provide a satisfactory form of gasket.

Another difficulty experienced in connection with refills in which the filtering material is of a cellulosic nature, especially where the refill is a cylinder composed of a stack of discs of cellulosic material, is that shrinkage of the cylinder occurs, primarily lengthwise of the cylinder, with a resultant leakage of the oil past the filtering material of the refill. Another of the objects of this invention is to provide means of preventing such leakage as the filtering material shrinks.

Certain specific embodiments of the inventive concept are disclosed in the appended drawings, in which Figure 1 is a sectional view of a filter embodying one type of gasket and one type of means for compensating for shrinkage of the filtering material.

Figure 4:
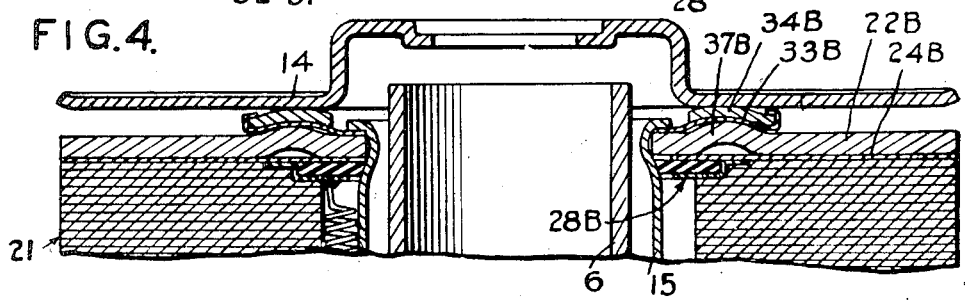

Figure 4 discloses a further modification of the gasket.

Figure 5:
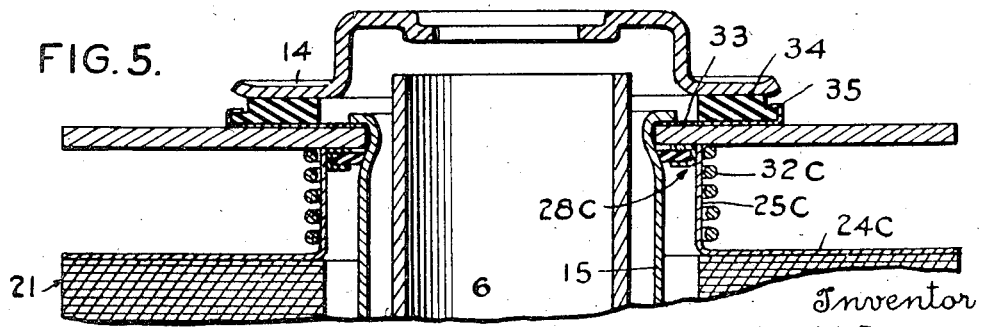

Figure 5 illustrates a modified form of floating plate.

Figure 1:
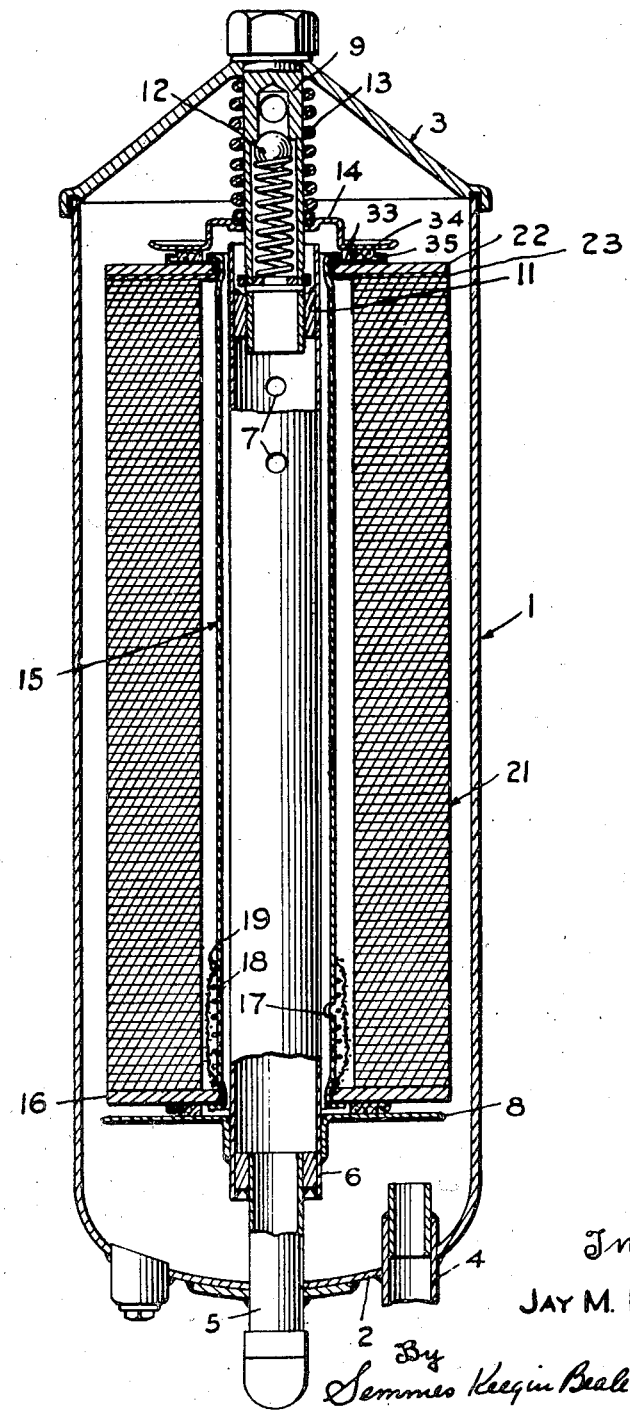

In Figure 1 there is disclosed a conventional form of filter consisting of a casing 1, a base 2 and a removable cover 3. The casing 1 is shown as cylindrical in shape, and mounted in the base of the casing is a tube 4 which normally serves as an inlet tube and a section of pipe 5 normally serving as the discharge tube. Suitably mounted upon the discharge tube 5 is a casing center tube 6 provided with apertures 7 at the upper end thereof and also provided with a base plate 8. The cover screw 9 is threadable within a bushing 11 mounted in the upper end of the center tube 6, and a by-pass relief valve, designated generally 12, is provided in the cover screw. A coil spring 13 surrounds the cover screw and bears against a filter top plate 14 which slides in a fluid-tight fit upon the cover screw.

The refill cartridge shown in Figure 1 comprises a refill center tube 15 which surrounds the filter center tube 6 and is provided with a refill base plate 16 about which the lower end of the center tube is spun. Apertures 17 are provided through which the oil passes, and a coil spring 18 is mounted upon the center tube adjacent such apertures over which fits a screening element 19 to prevent migration of filter material into the oil stream.

The filtering material per se shown in Figure 1 is made up of a plurality of apertured discs 21 which are stacked to form a cylinder as there depicted. These discs are shown diagrammatically and may be intact discs save for the central apertures, or may be an arrangement of specially designed discs in which a disc having channels communicating with its outer edge is stacked alternatively with a disc having channels communicating with its inner edge and a disc of a filter medium is positioned between the two above types mentioned to prevent direct flow of the fluid being filtered from the channels of the disc of one type to the channels of the disc of the other type. The discs are securely clamped together to provide a unitary cylindrical surface, and the oil is adapted to pass in a generally radial direction through the cylinder, from the outside to the inside of the device shown in Figure 1. When initially assembled, the discs may be arranged about the refill center tube and upon the refill base plate 16, compressed to the desired extent, and then secured in this position by means of refill top plate 22 over which the center tube is spun.

I preferably interpose between the refill top plate 22 and the top of the stacked discs a plate which is adapted to maintain a fluid-tight contact with the top disc to prevent by-passing of the discs when they contract. For instance, in Figures 1 and 2, and referring particularly to the latter, there is shown a disc 23 preferably made of flexible metal which is crimped around the inner periphery of top plate 22 and held securely in position when the refill center tube is spun about the top plate. The plate 23 is so formed that it has a natural flexure downwardly at its outer periphery, but when the refill is initially assembled, the compression of the discs and top plate 22 is such that the plate 23 is flat and contacts the top plate 22 throughout, as shown in Figure 1.

Figure 2:
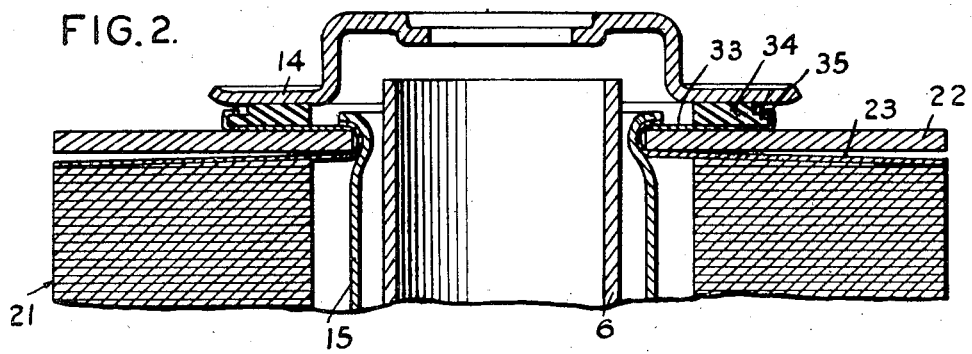
Figure 2 is a detailed view of the upper portion of the refill shown in Figure 1.

However, as indicated in Figure 2, as shrinkage of the discs occurs, and as the top filter disc retracts away from the refill top plate 22, the flexure of the plate 23 initially causes that plate, primarily the outer circumferential portion thereof, to follow the shrinking mass of discs. As the outer portion of flexible plate 23 recedes from the top plate 22, oil within the casing occupies the space so formed. The top of flexible plate 23 is therefore subjected to the pressure of the oil which serves to maintain the plate in tight engagement with the top disc of the stack and to thereby prevent any flow of oil between the top plate 22 and the top filter disc. It should be pointed out that as the pressure of the oil within the casing increases the discs will be further compressed by the flexible plate 23 which at all times maintains an oil-tight fit with the top disc. Of course, upon a drop in such oil pressure, the discs will expand and push the flexible plate 23 toward top plate 22. The flexible plate 23 shown in Figure 2 is, of course, practical only when the amount of shrinkage and compression of the discs is maintained within certain limits, but performs satisfactorily for such limited shrinkage and compression.

Figure 3:
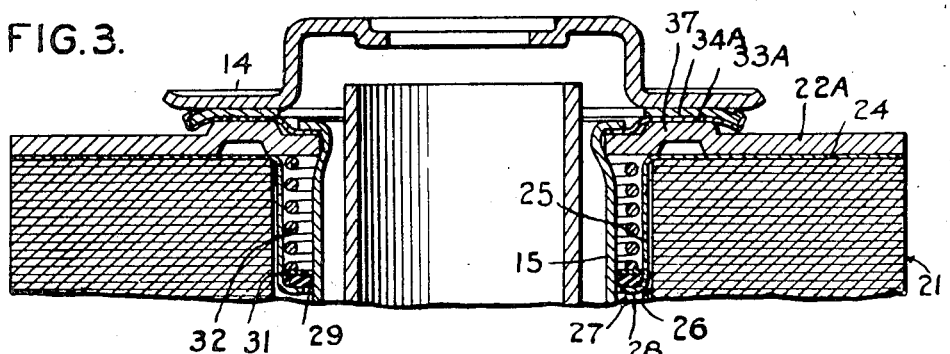
Figure 3 is a view of a modified form of gasket and one specific type of floating plate.

For more extended shrinkage of the filter mass, it is advisable to use a so-called "floating plate," and in Figures 3, 4 and 5 there are disclosed three specific forms of floating plates which may be used. It will be noted that in these figures the plates are not anchored to refill top plate 22 and, while initially in contact with the top plate, are capable of unlimited movement away therefrom.

For instance, in Figure 3, the floating plate is composed of a disc 24, preferably of metal although capable of being made of any other fluid-impervious material, and provided with a downturned flange 25 which extends down into the central channel of the stacked discs. It will be noted that the flange 25 is slightly spaced from the channel walls as at 26 to permit the flow of oil therebetween.

The flange 25, at its lower end, carries a radial seal, indicated generally by the numeral 27, which is formed by bending the flange as at 28. A suitable packing material 29, such as, for instance, neoprene, is embedded upon the bent portion 28 and a cover plate 31 secured thereover. The cover plate 31 may be suitably secured to the flange 25 in any desired manner, such as by brazing, spot welding, etc. It will be noted that both the bent portion 28 and the cover plate 31 have an inside diameter somewhat greater than the outside diameter of the refill center tube 15, in order to avoid contact therewith, but the packing ring 29 is of such a size as to maintain a fluid-tight fit with the outside of the refill center tube to prevent passage of oil therebetween. It will therefore be noted that the floating plate 24 is free to move with the filter mass 21, upon expansion and contraction of the latter, and the liquid seal 27 maintains a fluid-tight seal between the plate and the refill center tube without impeding movement of the floating plate.

To insure that the floating plate 24 will follow the filter material upon initial contraction of the latter, a coil spring 32 is fitted within the flange 25 and bears against the underside of refill top plate 22A and the cover plate 31. It should be pointed out that under some circumstances the spring 32 may be omitted, and that in all cases the pressure of oil upon the top of the floating plate, after initial retraction thereof from the top plate 22A, insures that the floating plate 24 will follow the filter mass throughout its retraction from the top plate 22A.

In Figure 4 there is merely shown a straight floating plate 24B provided with a floating seal 28B, such as disclosed and claimed in the copending application of Southwick W. Briggs, Serial No. 549,242, filed August 12, 1944.

In Figure 5 the floating plate comprises a disc 24C provided with an upturned flange 25C as opposed to the downturned flange 25 of Figure 3. The liquid seal 28C is of the same general construction and functions as the seal disclosed in Figure 3, and a corresponding spring 32C is provided, which fits around the outside of the flange 25C.

It will be noted from the foregoing that the flexible plate 23 and the various floating plates, together with their respective liquid seals, insure that there will be no by-passing of the filter material by reason of oil passing between the refill top plate 22 and the top of the filter mass. However, as previously pointed out, leakage in prior filters has frequently occurred between the assembled refill and the retaining means therefor. I have therefore provided several types of gasket particularly adapted for use between the refill and filter top plates and between the refill and filter base plates, but also capable of broad use for certain types of gasket installation. These gaskets not only serve to prevent objectionable flow of the gasket material, but also are of such a design as to assist in effective sealing of the gasket.

Referring first to Figure 2, it will be noted that there is provided an annular strip 33, the inner periphery of which is securely fixed to the inner periphery of refill top plate 22. In Figure 2 this is accomplished by spinning the refill center tube 15 and the flexible plate 23 over the inner periphery of the strip 33. The annular strip 33 is formed of a flexible or resilient material, preferably a light metal, and, by securing it to the refill top plate 22 at only its inner periphery, the remaining length or radius of the strip 33 is free to flex away from refill top plate 22, for a purpose to be later described. Positioned upon the annular strip 33 is a ring of packing material 34 which may be composed of any suitable gasket material. In practice I have found a composition of synthetic rubber and cork, sold under the trade name "Coprene," a particularly efficacious material. The ring 34 is provided with an annular shoulder 35, and the annular strip 33 is crimped around this shoulder to securely fix the gasket ring thereupon. It will be noted that the shoulder 35 is of limited height so that in initial operation at least there is no contact between the bent portion of strip 33 and the filter top plate 14.

In assembling the refill, sufficient pressure is applied to filter top plate 14 to not only take up any flex in the annular strip 33 and force it flat upon refill top plate 22, but also to insure a sufficiently tight fit between the filter plate and the top of gasket ring 34 to thereby prevent any passage of oil therebetween. Over the course of operation there is a tendency for the gasket ring 34 to flow, and the direction of such flow is outwardly. It will be noted, however, that the portion of the annular strip 33 bent around shoulder 35 prevents any flow of the gasket so encompassed, and serves to maintain a uniform and effective seal between the gasket 34 and filter top plate 14. It is likewise to be noted that the construction here disclosed assists in maintaining a tight seat by the gasket upon the filter top plate. In other words, if the gasket should have a tendency to leak over a period of operation, the oil would first enter between strip 33 and refill top plate 22 inasmuch as there is there provided a metal-to-metal contact. Any such oil, however, that might enter between these two elements would be under the same pressure as the body of oil within the filter casing, and would thereby increase the pressure applied to the gasket 34 to urge the latter tightly against the filter top plate 14. In this connection it will be appreciated that the area of the undersurface of strip 33 is relatively large and therefore the total pressure exerted by the oil against the gasket ring 34 will be appreciable and sufficient to maintain an effective oil seal. Likewise it will be appreciated that any oil that does seep within the strip 33 and refill top plate 22 is not free to enter the interior of the refill because of the secure clamping of the inner periphery of the strip to the refill top plate.

In Figure 3 there is shown a particularly effective embodiment of the concept contemplated by the gasket construction. In this case the strip 33A is secured at its inner periphery to the refill top plate 22A in substantially the same manner as shown in Figure 3—namely, by spinning the upper end of the refill center tube about the inner peripheries of the strip 33A and the refill top plate. However, it will be noted that the gasket ring 34A, in the case of Figure 3, is of thinner construction than that shown in Figure 2 and is not provided with a shoulder. In this case the strip 33A is bent around the entire outer periphery of the gasket ring. To maintain the contact between the end of the annular strip and the underside of the filter top plate at a minimum, the refill top plate 22A is provided with an upward projection 37 which flexes the strip 33A, thus leaving the outer edge of the gasket ring and strip relatively free. In the case of Figure 3, the projection 37 is angular and is formed by a suitable pressing of the refill top plate 22A. As in the case of Figure 2, it will be appreciated that the gasket structure here disclosed prevents outward flow of the gasket material, and the use of the flexible strip 33A insures that any oil tending to by-pass between the filter top plate and refill top plate will exert sufficient pressure upon the underside of the gasket to effectively maintain the seal.

In Figure 4 there is shown a gasket generally similar to the one shown in Figure 3 provided with a flexible strip 33B, a gasket ring 34B and with a projection 37B on the refill top plate 22B. However, it will be noted that the projection 37B, instead of being angular as in the case of Figure 3, is shown as rounded. This rounded shape, under certain circumstances, may be more advantageous than the angular projection 37 of Figure 3.

It will be appreciated from the foregoing that there is provided by this invention an improved refill cartridge. The flexible and floating plates compensate for any shrinkage of the filter material and effectively prevent leakage as the material shrinks. The gasket constructions disclosed prevent flow of the gasket material and also incorporate provisions whereby the desired sealing between the gasket and the filter top plate is assisted by the pressure of the oil to which the filter is subjected.

While I have shown and described several embodiments of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A gasket to prevent the flow of liquid between a first member and a second member from a body of liquid to which the members are exposed, comprising a strip of resilient material secured at one point to the first member and extending toward the liquid body, said strip throughout a substantial portion of its extension being unattached to the first member and normally being adapted to flex away therefrom, and a gasket material lying upon and secured to the unattached portion of the strip between the two members.

2. A gasket to prevent the flow of liquid between a first member and a second member from a body of liquid to which the members are exposed, comprising a strip of resilient material secured at one point to the first member and extending toward the liquid body, said strip throughout a substantial portion of its extension being unattached to the first member and normally being adapted to flex away therefrom, and a gasket material lying upon the unattached portion of the strip, said strip being bent around the edge of the gasket material exposed to the liquid body to securely hold the said material to the strip.

3. A gasket to prevent the flow of liquid between a first member and a second member from a body of liquid to which the members are exposed, comprising a strip of resilient material secured at one point to the first member and extending toward the liquid body, said strip throughout a substantial portion of its extension being unattached to the first member and normally being adapted to flex away therefrom, said first member having a projection adapted to bear against the unattached portion of the strip, and a gasket material lying upon and secured to the unattached portion of the strip between the two members.

4. A gasket to prevent the flow of liquid between a first member and a second member from a body of liquid to which the members are exposed, comprising a strip of resilient material secured at one point to the first member and extending toward the liquid body, said strip throughout a substantial portion of its extension being unattached to the first member and normally being adapted to flex away therefrom, said first member having an angular projection adapted to bear against the unattached portion of the strip, and a gasket material lying upon and secured to the unattached portion of the strip between the two members.

5. A gasket to prevent the flow of liquid between a first member and a second member from a body of liquid to which the members are exposed, comprising a strip of resilient material secured at one point to the first member and extending toward the liquid body, said strip throughout a substantial portion of its extension being unattached to the first member and normally being adapted to flex away therefrom, said first member having a rounded projection adapted to bear against the unattached portion of the strip, and a gasket material lying upon and secured to the unattached portion of the strip between the two members.

6. A gasket to prevent the flow of liquid between two circular members from a liquid body to which the members are exposed, comprising an annular element composed of gasket material provided with a radial shoulder on its outer periphery, an annular strip secured to one of the members and supporting the annular element, the outer periphery of said strip being bent around the shoulder to secure the annular element to the strip and to prevent flow of the gasket material.

7. A gasket to prevent the flow of liquid between two circular members juxtaposed in end-to-end relationship, said liquid being exteriorly disposed with respect to the members, comprising an annular strip of resilient material secured at its inner periphery to one of the members, said strip throughout a substantial portion of its radius being unattached to the member and normally adapted to flex away therefrom, an annular gasket material lying upon the unattached portion of the strip, and means at the outer periphery of the resilient strip engaging the outer periphery of the gasket material to securely hold the said material to the strip and to prevent flow of the gasket material.

JAY M. BESORE.

REFERENCES CITED

The following references are of record in the file of this patent:

UNITED STATES PATENTS

| Number | Name | Date |
| --- | --- | --- |
| 1,792,189 | Robinson | Feb. 10, 1931 |
| 1,985,473 | Victor | Dec. 25, 1934 |
| 2,200,688 | Bridgers | May 14, 1940 |
| 2,218,800 | Williams | Oct. 22, 1940 |
| 2,294,262 | Wilkinson | Aug. 25, 1942 |
| 2,313,307 | Wilkinson | Mar. 9, 1943 |
| 2,339,703 | Kamrath | Jan. 18, 1944 |
| 2,359,118 | Johnston | Sept. 26, 1944 |
| 2,360,020 | Skinner et al. | Oct. 10, 1944 |

Certificate of Correction

Patent No. 2,454,030.  November 16, 1948.

JAY M. BESORE

It is hereby certified that error appears in the printed specification of the above numbered patent requiring correction as follows:

Column 2, lines 28 and 29, for "alternatively" read *alternately*; and that the said Letters Patent should be read with this correction therein that the same may conform to the record of the case in the Patent Office.

Signed and sealed this 18th day of January, A. D. 1949.

[SEAL]

THOMAS F. MURPHY,
*Assistant Commissioner of Patents.*